(12) United States Patent
Horn, Jr.

(10) Patent No.: US 7,703,777 B2
(45) Date of Patent: Apr. 27, 2010

(54) PORTABLE CART WITH AN AIR COMPRESSOR AND ELECTRICAL GENERATOR

(76) Inventor: Charles Eugene Horn, Jr., 1707 Donna Dr., Oxford, AL (US) 36203

( * ) Notice: Subject to any disclaimer, the term of this patent is extended or adjusted under 35 U.S.C. 154(b) by 100 days.

(21) Appl. No.: 12/218,969

(22) Filed: Jul. 21, 2008

(65) Prior Publication Data

US 2010/0013177 A1  Jan. 21, 2010

(51) Int. Cl.
*B62B 3/04* (2006.01)
(52) U.S. Cl. .................................. 280/47.35; 280/47.34
(58) Field of Classification Search ............... 280/47.34, 280/47.35
See application file for complete search history.

(56) References Cited

U.S. PATENT DOCUMENTS

| | | | | |
|---|---|---|---|---|
| 4,759,560 | A | * | 7/1988 | Virgulti .................... 280/47.26 |
| 5,366,308 | A | * | 11/1994 | Crispino ........................ 401/1 |
| 5,642,898 | A | * | 7/1997 | Wise ........................... 280/652 |
| D418,809 | S | | 1/2000 | Frank |
| 6,051,809 | A | * | 4/2000 | Colella ........................ 219/133 |
| 6,234,409 | B1 | * | 5/2001 | Aslakson .................... 239/172 |
| D444,279 | S | | 6/2001 | Kristiansen |
| D450,061 | S | | 11/2001 | Graber |
| 6,360,556 | B1 | * | 3/2002 | Gagliano ...................... 62/396 |
| 6,382,467 | B2 | * | 5/2002 | Saveliev et al. ............. 222/148 |
| 6,596,972 | B1 | * | 7/2003 | Di Novo et al. .......... 219/137.9 |
| D494,929 | S | | 8/2004 | Imai |
| 6,935,642 | B1 | | 8/2005 | Craig |
| 6,989,509 | B2 | * | 1/2006 | Silvestro ..................... 219/133 |
| 6,992,265 | B2 | * | 1/2006 | Bender et al. ............... 219/133 |
| 7,098,424 | B2 | * | 8/2006 | Silvestro ..................... 219/133 |
| 2001/0022323 | A1 | * | 9/2001 | Aslakson .................... 239/172 |
| 2008/0297103 | A1 | * | 12/2008 | Windsor ..................... 320/101 |

* cited by examiner

*Primary Examiner*—Jeffrey J Restifo
(74) *Attorney, Agent, or Firm*—Theresa M. Seal

(57) ABSTRACT

A portable contractor cart for use on construction sites that have not yet been hard wired includes a frame having front and rear wheels and arranged on the upper deck side of the frame from front to back are a 50 foot electric cord reel and a 50 foot compressed air line, an air compressor, an electrical generator, a refrigerated cooler and a weatherproof radio/cd player. A handle is mounted to the rear of the frame and a pivotable foot brake is interconnected to the rear axle for locking and unlocking the rear wheels, and the cart can be motorized wherein a motor and pulley arrangement would be mounted to the underside of the frame. Snaps are spaced about the periphery of the frame for attaching a covering thereto thereby protecting the cart when it is left outside on the job site. A welder generator for a TIG or MIG welder can also be mounted on the frame in place of the air compressor, and a trailer hitch can extend from the front of the frame for towing the cart from site to site.

14 Claims, 4 Drawing Sheets

PORTABLE CART WITH AN AIR COMPRESSOR AND ELECTRICAL GENERATOR

FIELD OF THE INVENTION

The present invention pertains to construction tools and equipment, and more particularly pertains to a portable construction cart that includes the power, tools, and equipment for completing construction jobs.

BACKGROUND OF THE INVENTION

Construction sites require a wide variety of tools, equipment, and machinery ranging from massive cranes whose booms extend skyward many stories to common tools that can be easily carried on a tool belt and which can be found in most residential homes, businesses and commercial establishments. Aside from the vehicular-type machinery—cranes, dump trucks, skid loaders, bobcats, graders, backhoes, excavators, etc.,—many of the other types of tools and equipment are either gas or electric powered. Air powered tools can include nailers and sanders while electric powered tools the various types of saws and hammer drills.

However, many construction sites are not located near readily available electric power source such as a nearby service pole that requires service from the local electric company to make usable for the contractor, construction company and work crew. Indeed, many homes, getaways, cabins, storage barns, etc., are far off the beaten path. In addition, in today's world more than ever time is money, and with the rise in the cost of construction and building materials, no contractor wants his/her crew to arrive at a construction site and be rendered idle because of a lack of available power to power even the most basic of tools and equipment. Since numerous costs are being incurred even when the crew is idle at the construction site, a way must be found to provide power at the construction prior to the power company arriving and hard wiring a service pole or poles. Thus, portable generators have been designed for large-scale construction, but most construction is not large scale, and thus such portable generators are not always practical both for reasons of cost and the constant din they produce when in operation. Therefore, it is desirable to design portable generator-type carts or dolleys that are practical for all types of construction sites, and especially adaptable and maneuverable on and about smaller scale construction sites.

For example, various designs for carts that carry or support compressors and generators include the Frank design patent (U.S. design patent 418,809), the Kristiansen et al. design patent (U.S. design patent 444,279 S), the Graber et al. design patent (U.S. design patent 450,061 S), the Imai design patent (U.S. design patent 494,929 S), and the Imai design patent (U.S. design patent 489,327 S).

In addition the Graig et al. patent (U.S. Pat. No. 6,935,643 B1) discloses a cart frame generator pulled by hand that includes a cart-type frame assembly for transporting the generator and in which a partial cage extends about the generator.

The Silvestro patent (U.S. Pat. No. 7,098,424 B2) discloses a self-contained integrated welder/generator and compressor wherein a housing partially protects the aforementioned elements.

Nonetheless, despite the ingenuity of the above devices, there remains a need for a portable cart capable of powering air and electric tools on job sites that haven't yet been hard wired.

SUMMARY OF THE INVENTION

The present invention comprehends a portable contractor cart that is easily maneuverable to and about job or construction sites, and provides power for the various construction tools in advance of the site being hard wired by the local electric company service provider. The portable contractor cart thus provides power for both air and electric powered tools, cuts down on any down that may occur when waiting for the site to be hard wired, and is especially useful for construction jobs in out of the way locations, or locations and sites that are off the beaten path.

The portable contractor cart of the present invention includes a frame having a front and rear. A trailer hitch can be mounted to the front for towing from site to site. A unshaped handle is mounted to the rear of the frame. The frame includes an upper deck side and an opposite underside, and mounted to the underside are a pair of front wheels and a pair of rear wheels. The front wheels pivot independently of each other, and a rear axle interconnects the rear wheels. The rear wheels can be motorized through a motor and pulley arrangement also mounted to the underside adjacent the rear of the cart. Mounted to the rear axle is a manually operable foot brake for locking and unlocking the rear axle, and thus locking the rear wheels and releasing the rear wheels so that the cart can be positioned, repositioned, and moved.

Located on the upper deck side of the frame are a variety of pieces and elements that provide power for the various tools and equipment used on any construction site whether small, medium, or large. The primary pieces are an air compressor and an electrical generator whose size is dependent on the desired equipment load. A cooler welder generator can also be for the air compressor. Located at the front of the frame is a 50-foot electric cord reel and a 50-foot compressed air line. Located at the rear of the frame is a refrigerated cooler with a drain and a weatherproof radio/cd player.

In addition, a plurality of snaps are mounted to and spaced about the border of the frame and to which a waterproof covering is attached for keeping the various pieces and elements dry during various weather conditions. The motorized version also includes a start button located at the rear and a forward and reverse arrow button for directing and maneuvering the cart about the construction site.

It is an objective of the present invention to provide a portable cart with an air compressor and an electrical generator for powering air and electric tools on a job site that has not yet been hard wired.

It is another objective of the present invention to provide a portable cart with an air compressor and an electrical generator that allows a contractor to commence work as soon as the foundation is in thereby saving time and money.

It is yet another objective of the present invention to provide a portable cart with an air compressor and an electrical generator that can be modified or enhanced to include a welder instead of the air compressor, or both.

It is still yet another objective of the present invention to provide a portable cart with an air compressor and an electrical generator wherein the cart can be motorized and can be equipped with a trailer hitch.

Yet another objective of the present invention is to provide a portable cart with an air compressor and an electrical generator that provides construction workers and crews with portable power to complete construction jobs, both small and large, without the use or availability of power at the construction site.

Still another objective of the present invention is to provide a portable cart with an air compressor and an electrical generator that can be easily moved from construction site to construction site.

Still yet another objective of the present invention is to provide a portable cart with an air compressor and an electrical generator that includes a portable and removable covering to protect the cart when not in use and when parked or positioned in outdoors and during inclement weather.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-9 is a portable cart 10 for use on construction and job sites that have not yet had a service pole hard wired for providing electricity to the site by the local electric company. The portable cart 10 provides power for operating the various types of electric and pneumatic tools, such as electric saws and hammer drills and pneumatic nailers and sanders that are used on small, medium, and large-scale construction sites.

Figure 7:
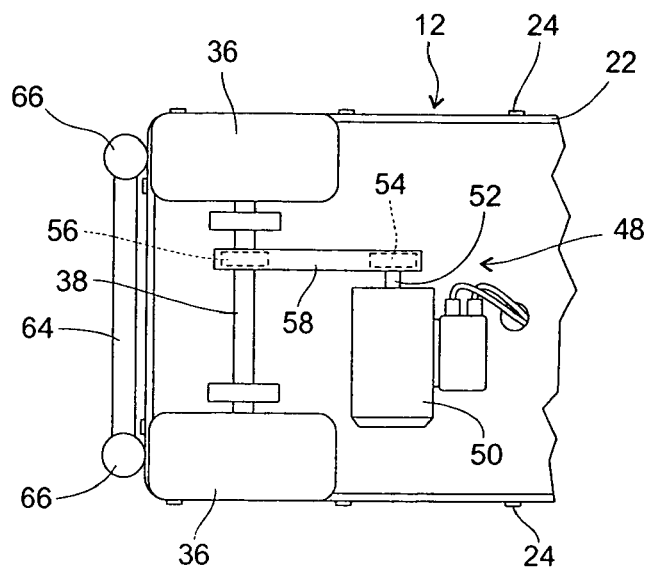
FIG. 7 is a bottom plan view in enlarged section of the portable contractor cart of the present invention illustrating the drive arrangement for the rear wheels that includes a motor and belt or pulley system.
Figure 8:
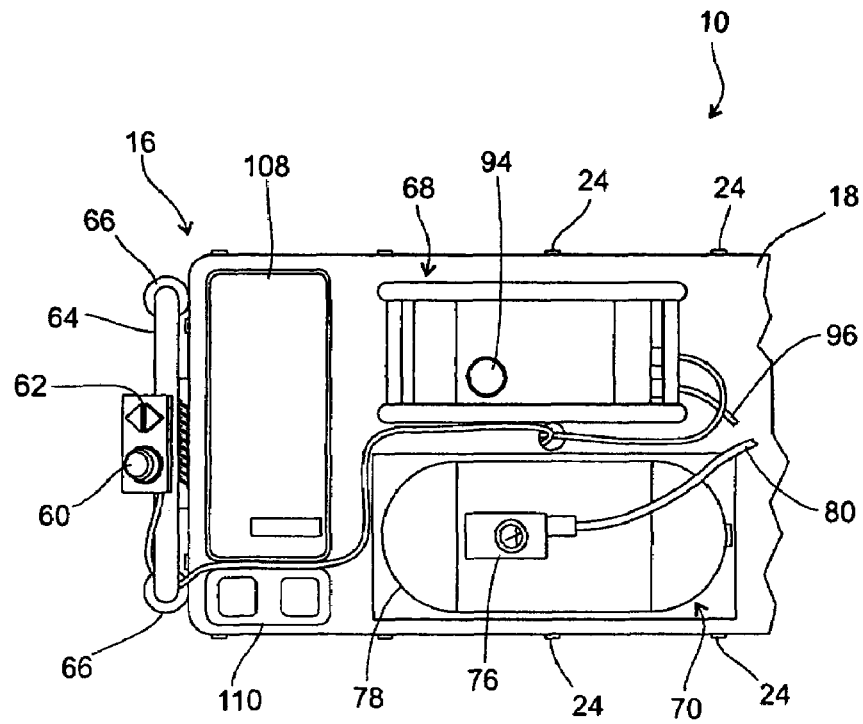
FIG. 8 is a top plan view in enlarged section of the portable contractor cart of the present invention illustrating the forward and reverse motor controls for the cart that is motorized and a warning light adjacent the rear of the cart.
Figure 9:
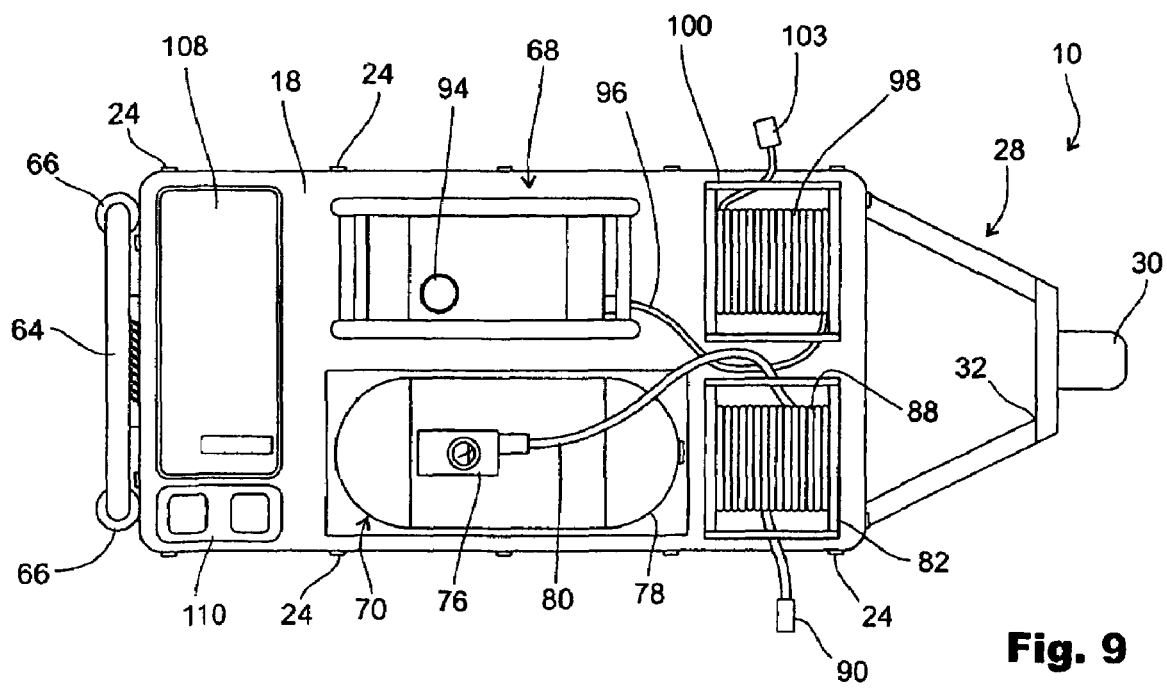
FIG. 9 is a top plan view of the portable contractor cart of the present invention illustrating a trailer hitch projecting from the front of the cart that allows the cart to be towed from construction site to construction site.

Thus, as shown in FIGS. 1-9, the portable construction cart 10, which is manually operable or which can be motorized, includes a frame 12, and the frame 12 includes a front 14 and an opposite rear 16. The frame 12 includes an upper deck side 18 and an opposite lower or underside 20. A continuous peripheral border 22 encompasses the frame 12, and mounted to the border 22, and spaced continuously thereabout, are a plurality of snaps 24. A durable, flexible, foldable, waterproof and weatherproof cover 26 is included for removable attachment to the snaps 24 with the cover 26 including interior cover snaps (not shown) that engage to or disengage from the snaps 24 arranged about the border 22 of the frame 12. The cover 26 provides protection for the various elements and features hereinafter to be described that are mounted upon the upper deck side 18 of the frame 12, and thus the contractor construction cart 12 can be left outdoors if need be while maintaining the weatherproof condition of the features and elements arranged on the frame 12. The cover 26 is easily foldable for storage when not in use. A trailer hitch 28 can be mounted to and extend from the front 14 of the frame 12 as shown in FIG. 9. A trailer hitch lock and release mechanism 30 is mounted to the apex of the hitch frame 32 for connection to a vehicular hitch thereby allowing the towing of the cart 10 about the construction site and to other construction sites.

Figure 3:
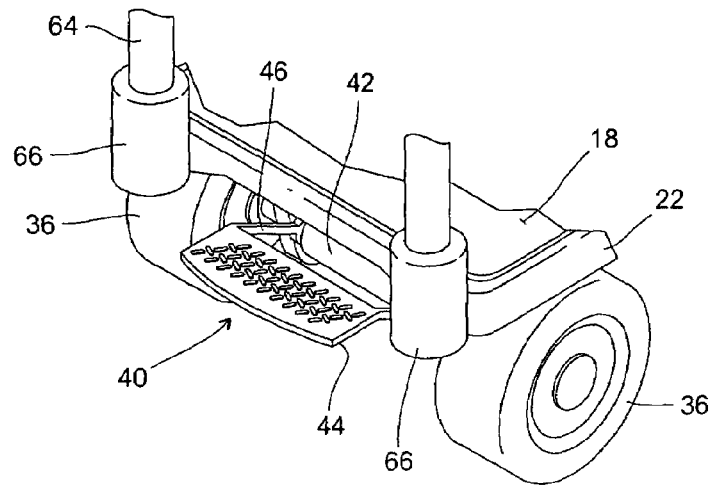
FIG. 3 is an enlarged perspective view of the portable contractor cart of the present invention illustrating the foot brake for locking and unlocking the rear axle.
Figure 4:
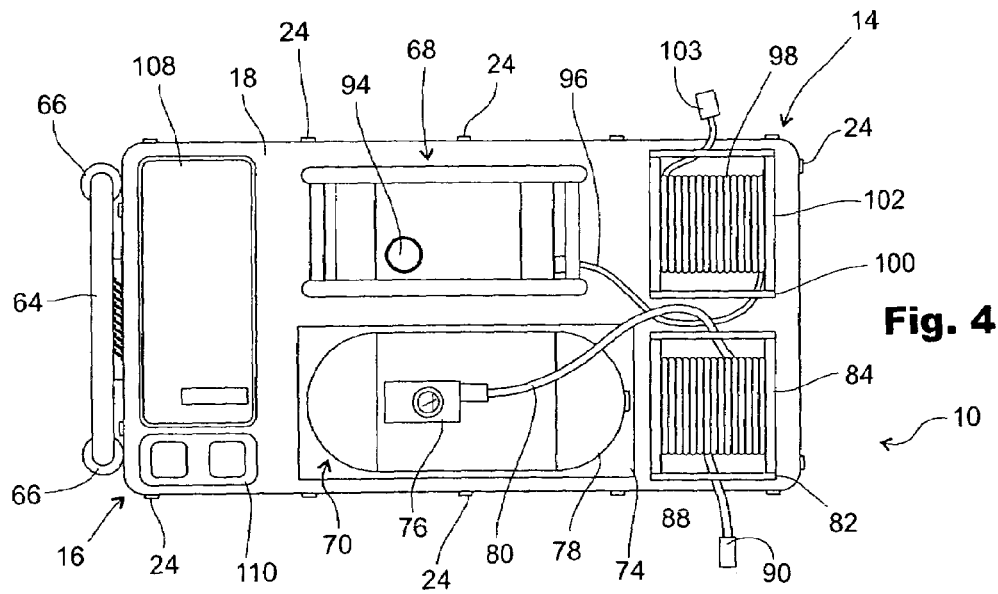
FIG. 4 is a top plan view of the portable contractor cart of the present invention illustrating the arrangement on the deck of the cart of the primary elements and features.
Figure 5:
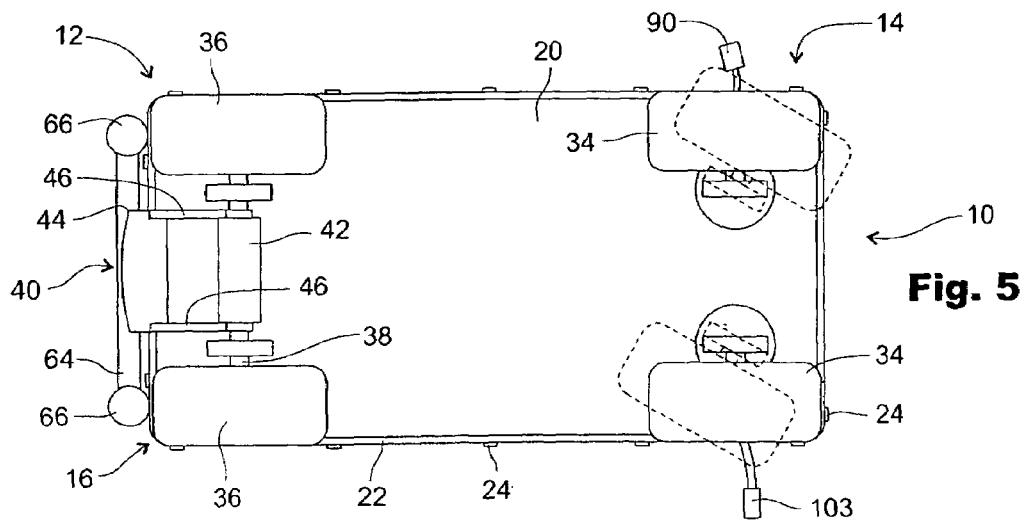
FIG. 5 is a bottom plan view of the portable contractor cart of the present invention illustrating the rear wheels and axle drive arrangement and the turning ability of the front wheels.

Illustrated in FIGS. 1, 2, 4, 5, and 7 are a pair of front wheels 34 and a pair of rear wheels 36 both of which are mounted to the underside 20 of the frame 12. The pair of front wheels 34 independently turn or pivot and the rear wheels 36 are interconnected by a rear axle 38. Illustrated in FIGS. 3 and 5 is a rear foot brake 40 that is interconnected to the rear axle 38 for locking and unlocking or releasing the rear axle 38 and, as a consequence, locking and releasing the rear wheels 34 and 36. The rear foot brake 40 includes a brake cylinder 42 mounted upon the rear axle 38 for physical engagement to and disengagement from rear axle 38, and a foot brake pedal 44 projecting from the rear 16 of the frame 12 and pivotably interconnected to the brake cylinder 42 by arms or struts 46. The brake pedal 44 is thus easily accessible and can be easily stepped on or pressed for initiating and setting the locking action of the brake cylinder 42 to the rear axle 38 thereby locking the rear 36 in place; and for initiating and causing the unlocking and releasing of the brake cylinder 42 from the rear axle 36 thereby allowing the rear wheels 36 to again rotate so that the cart 10 can be moved and positioned.

FIGS. 7 and 8 illustrate the motorized embodiment for the portable cart 10. Mounted to the underside 20 of the cart 10 is a motor and drive arrangement 48 that includes a motor 50 and gas tank. Projecting from the motor 50 is a main drive shaft 52 and mounted to the distal end of the main drive shaft 52 is a main drive pulley 54. A secondary rear axle pulley 56 is mounted to the rear axle 38, and a main drive belt 58 extends about main pulley 54 and rear axle pulley 56 for drivingly interconnecting the motor 50 to the rear axle 38. Shown in FIG. 8 is a simple control system that includes a start on/off push button 60 and forward and reverse directional arrow flasherstbuttons 62 that are electrically interconnected to the motor and drive arrangement 48 by the appropriate electrical wires or conduit. Maneuvering, turning, directing and moving the cart 10 on and about the construction site is facilitated by a rear unshaped cart handle 64 that the user can grip to control the cart 10 when the motorized embodiment is used or to push and pull the cart 10 when the cart 10 is non-motorized. The handle 64 fits into spaced-apart handle sockets 66 located at the rear 16 of the frame 12 thereby allowing for the removal of the handle 64 when appropriate.

Figure 6:
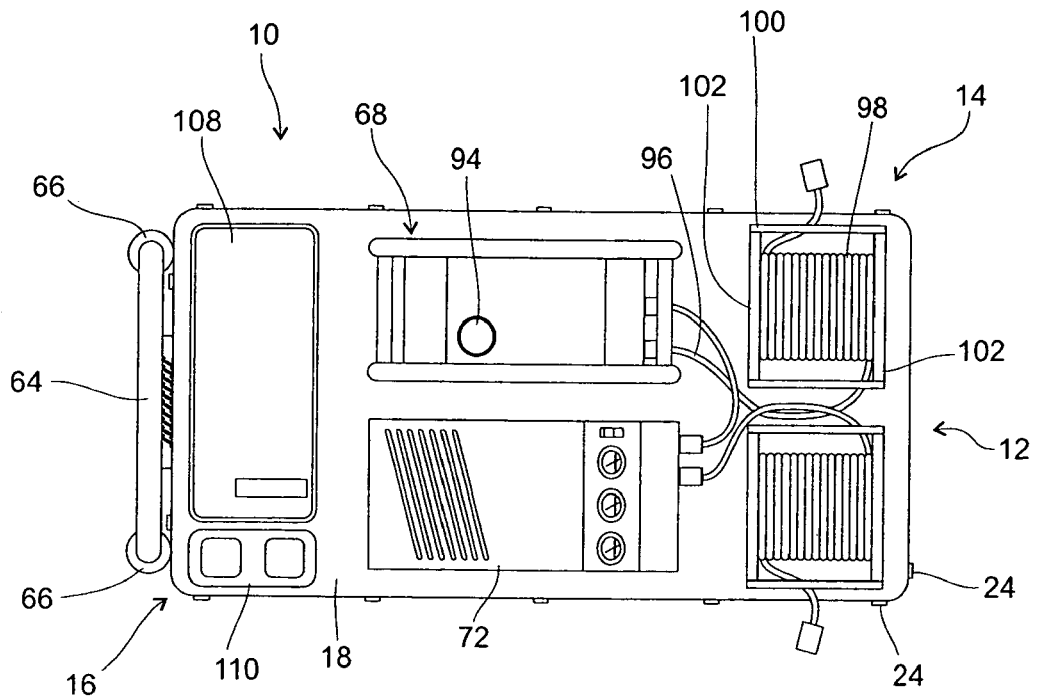
FIG. 6 is a top plan view of the portable contractor cart of the present invention illustrating a cooler welder generator in place of the air compressor on the deck of the cart.

As shown in FIGS. 2, 4, 8, and 9, mounted on the upper deck side 18 of the frame 12 of the cart 10 are the elements, features and devices that provide the pneumatic and electrical power as well as other enhancements that aid and assist the construction crew. An electrical generator 68 is mounted on the upper deck side 18 for providing electric power to such tools as electric saws and hammer drills. The electrical generator 68 can be sized for the appropriate equipment load. In addition, an air compressor 70 is mounted on the upper deck side 18 adjacent to the electrical generator 68. One preferred size for the air compressor 70 is between 12 and 17 gallons. FIG. 6 illustrates a cooler welder generator 72 located on the upper deck side 18 beside the electrical generator 68 and taking the place of the air compressor 70. The cooler welder generator 72 would be used for powering such welders as MIG and TIG welders. It should be noted that the air compressor 70, the electrical generator 68 and/or the cooler welder generator 72 may be disposed on a support plate 74 that rests on the upper deck side 18 of the frame 12. The support plate 74 helps to dampen the vibrations caused by the operation of the aforedescribed equipment.

As shown in FIGS. 2, 4, 8, and 9, the air compressor 70 includes an air pressure gauge and regulator 76 mounted on the top of the air compressor tank 78 for regulating airflow from the tank 78. A main compressor line 80 extends from the air pressure gauge 76 to an airline compressor reel 82. The reel 82 includes a pair of mounting brackets 84 and a rotatable axle or spindle 86 mounted to and extending between the mounting brackets 84. A flexible airline hose or conduit 88, preferably at least 50 feet in length and terminating with an air nozzle 90, is mounted upon the axle 86 of the reel 82 and is in airflow registration with the main compressor line 80. The air nozzle 90 is detachably securable to the various types of pneumatic power tools used for construction. The airline hose 88 can be manually unreeled to the appropriate length, and then reeled back in when the compressor 70 is not in operation. Mounted to a side-supporting member of the reel 82 is an aperture 91 circumscribed by roller guides 92 through which the airline hose 88 is withdrawn or retracted with the roller guides 92. The roller guides 92 facilitate airline hose 88 withdrawal and retraction by minimizing frictional resistance and providing a guide for the passage of the airline hose 88 therethrough.

Figure 1:
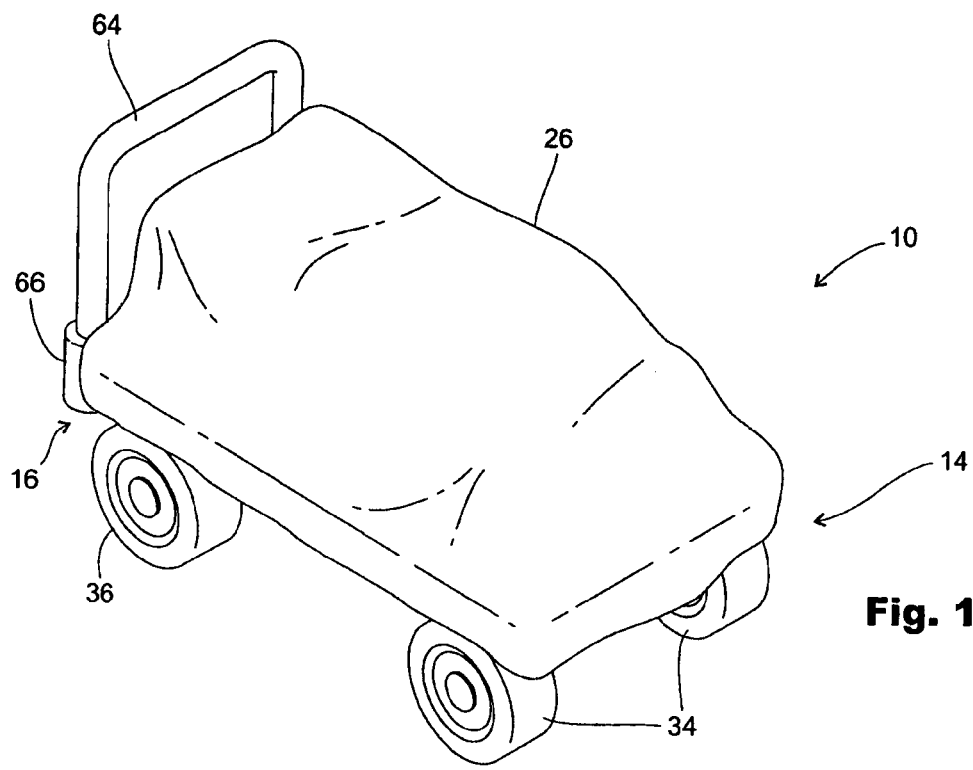
FIG. 1 is a perspective view of the portable contractor cart of the present invention illustrating the covering attached to and spread over the cart.
Figure 2:
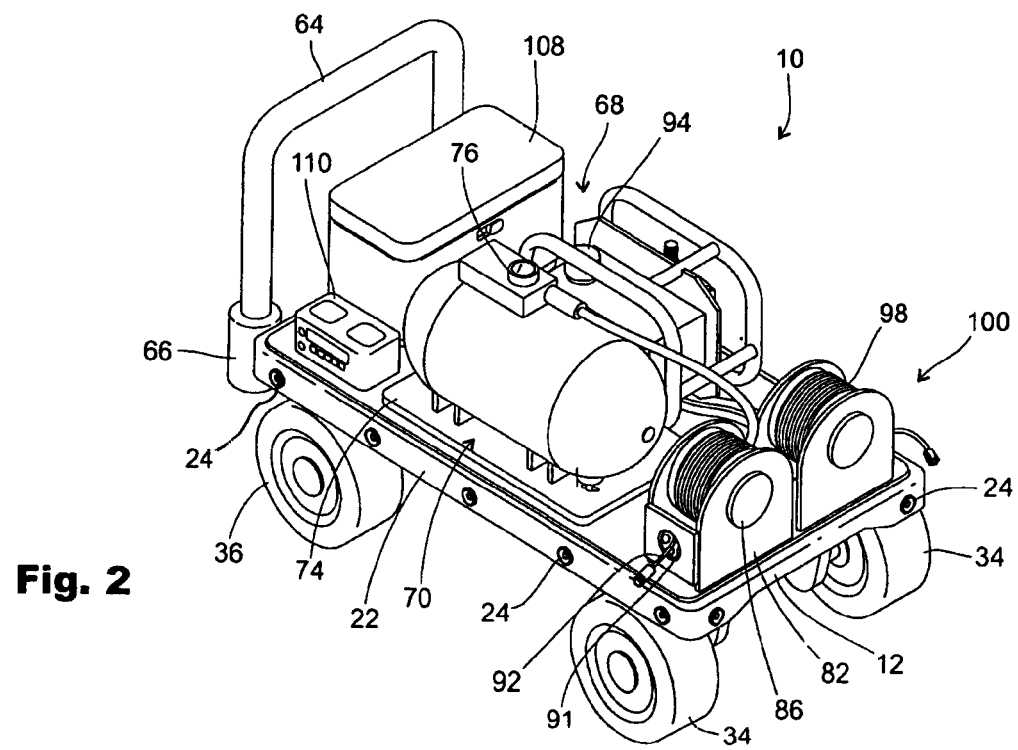
FIG. 2 is a perspective view of the portable contractor cart of the present invention illustrating the arrangement on the cart of the primary elements and features.

Mounted on the upper surface of the electrical generator 68, as shown in FIGS. 2, 4, and 6, is a control gauge 94 and extending from the generator 68 is a main electrical line 96 that interconnects to a flexible electrical cord 98 of at least 50 feet in length. The electrical cord 98 in wrapped about an electrical reel 100 rotatably mounted on spaced-apart brackets 102, and the electrical cord 98 is interconnected to the main electrical line 96 via the reel 100 and mounting brackets 102. The electrical cord 98 terminates with connection member 103 that is detachably engageable to any of the various types of electric power tools used for construction jobs. On one side supporting member of the electrical reel 100 is an opening 104 bounded by electrical line roller guides 106 through which the electrical cord 98 passes during retraction and extension for minimizing friction resistance of the electrical cord 98 and facilitating its retraction and extension upon the electrical reel 100. For the motorized embodiment, as shown in FIGS. 7 and 8, the electrical generator 68 can be interconnected to the motor and drive system.

As shown in FIGS. 2, 4, 6, 8, and 9, the cart 10 includes several other features to enhance the operation of the work site by way of providing a communication means and a beverage cooler means. Thus, the beverage cooler means can include the provision of a refrigerated cooler 108 disposed on the upper deck side 18 adjacent the rear 16 of the frame 12 and the cart handle 64. The beverage cooler 108 includes built-in drain for draining the cooler 108 while the cooler 108 remains seated on the upper deck side 18 of the frame 12 of the cart 10. In addition, the cart 10 includes a weatherproof combination radio/cd player 110 for providing background music to the construction site as well as news and information.

While the invention has been shown and described in a preferred embodiment, it will be apparent to those skilled in the art that numerous alterations, modifications, and variations will be possible and practicable without departing from the spirit, scope, tenor, and gist of the invention as set forth in the aforementioned detailed description and appended claims.

I claim:

1. A portable contractor cart for use at a construction site for which electricity has not yet been provided by the electrical company, comprising:
    a frame having a front and a rear, and an underside and an upper deck side;
    a pair of front wheels mounted to the underside and independently pivotable for steering and turning;
    a pair of rear wheels mounted to the underside and interconnected by a rear axle;
    a rear foot brake interconnected to the rear axle and which can be pressed for locking the rear axle to hold the front wheels and the rear wheels in position and for releasing the rear axle so that the front wheels and the rear wheels can rotate;
    an electrical generator mounted on the upper deck side for providing power to the electrical power tools used on the construction site;
    an electrical reel mounted on the upper deck side adjacent to the electrical generator and about which a flexible electric cord is wound with the electrical cord being interconnected to the electrical generator;
    an air compressor mounted on the upper deck side beside the electrical generator for providing air under pressure to operate pneumatic power tools that are used on the construction site;
    an airline compressor reel mounted on the upper deck side beside the air compressor and about which a flexible airline hose is wound with the airline hose being interconnected to the air compressor;
    a beverage cooler mounted on the upper deck side of the frame adjacent the rear of the frame;
    a combination radio/cd player mounted on the upper deck side of the frame beside the beverage cooler;
    a continuous border extending about the frame;
    a plurality of snaps mounted to and spaced about the border of the frame; and
    a flexible, waterproof and weather proof cover that is removably attachable to the snaps for covering and protecting the electrical generator, the electrical reel, the air compressor, the airline compressor reel, the beverage cooler, and the combination radio/cd player when the cart is not in operation.

2. The portable contractor cart of claim 1 further comprising a pair of handle sockets mounted to the rear of the frame.

3. The portable contractor cart of claim 2 further comprising a handle that is removably attachable to the handle sockets and which is used to guide and direct the cart.

4. The portable contractor cart of claim 3 further comprising a motor and drive arrangement that includes a motor mounted to the underside of the frame and which is drivingly interconnected to the rear axle by a main drive belt.

5. The portable contractor cart of claim 4 further comprising a start on/off push button electrically interconnected to the motor and drive arrangement for initiating operation of the motor and non-manual movement of the cart.

6. The portable contractor cart of claim 5 further comprising a cooler welder generator mounted to the upper deck side of the frame.

7. A portable contractor cart for use at a construction site that has not yet been hard wired for electricity by the local electrical company, comprising:

a frame having a front and a rear and an underside and an upper deck side;

a pair of front wheels mounted to the underside and independently pivotable for steering and turning;

a pair of rear wheels mounted to the underside and interconnected by a rear axle;

a rear foot brake interconnected to the rear axle and which can be pressed for locking the rear axle and preventing the rotation of the rear wheels and the front wheels and for releasing the rear axle thereby allowing the rotation of the rear wheels and the front wheels;

a continuous border extending about the frame;

an electrical generator mounted on the upper deck side for providing power to the electrical power tools that are used on the construction site;

an electrical reel mounted on the upper deck side adjacent to the electrical generator and about which a flexible electric cord is wound with the electrical cord being interconnected to the electrical generator;

an air compressor mounted on the upper deck side beside the electrical generator for providing air under pressure to operate the pneumatic powered tools that are used on the construction site;

an airline compressor reel mounted on the upper deck side beside the air compressor and about which a flexible airline hose is wound with the airline hose being interconnected to the air compressor;

a continuous border extending about the frame;

a plurality of snaps mounted to and spaced about the border of the frame; and a flexible waterproof and weatherproof cover removably attachable to the snaps for covering and protecting the electrical generator, the electrical reel, the air compressor and the airline compressor reel when the cart is not in operation.

8. The portable contractor cart of claim 7 further comprising a beverage cooler mounted on the upper deck side of the frame adjacent the rear of the frame.

9. The portable contractor cart of claim 8 further comprising a combination radio/cd player mounted on the upper deck side of the frame adjacent the rear and beside the beverage cooler.

10. The portable contractor cart of claim 9 further comprising a pair of handle sockets mounted to the rear of the frame.

11. The portable contractor cart of claim 10 further comprising a handle that is removably attachable to the handle sockets and which is used to guide and direct the cart about the construction site.

12. The portable contractor cart of claim 11 further comprising a motor and drive arrangement that includes a motor mounted to the underside of the frame and which is drivingly interconnected to the rear axle by a main drive belt.

13. The portable contractor cart of claim 12 further comprising a start on/off push button electrically interconnected to the motor and drive arrangement for initiating the operation of the motor and drive arrangement and for stopping the operation of the motor and drive arrangement.

14. The portable contractor cart of claim 13 further comprising a cooler welder generator that is mounted to the upper deck side of the frame for operating welding equipment.

\* \* \* \* \*